Figure 1:
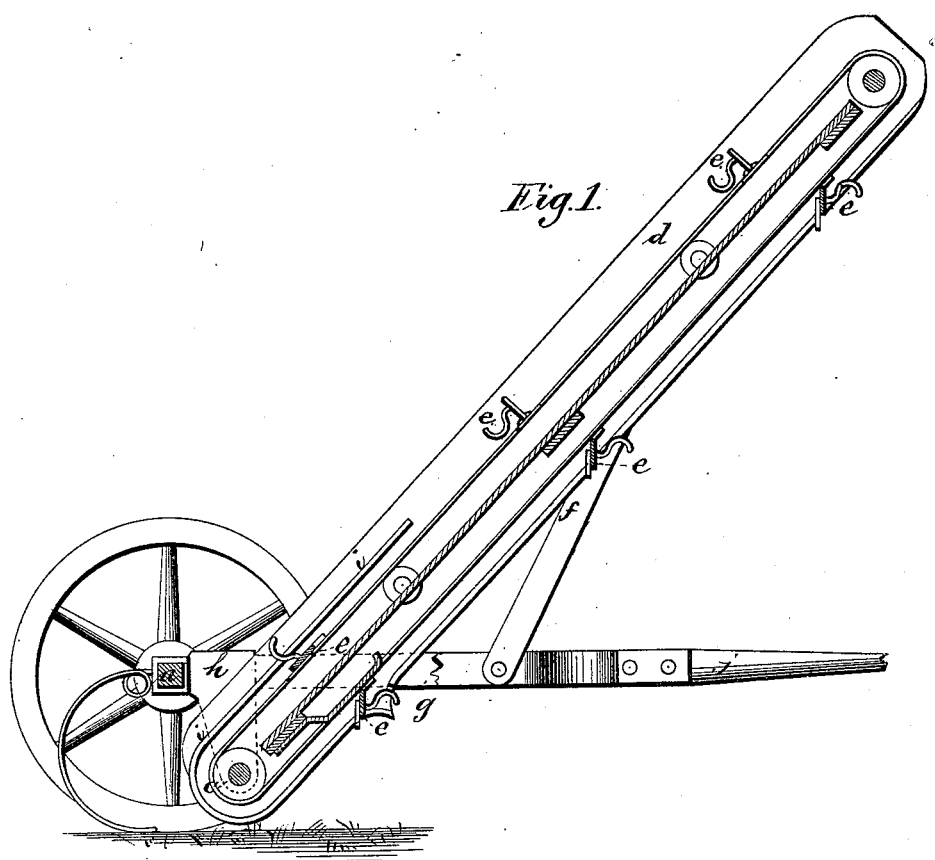

2 Sheets—Sheet 1.

W. J. HICKS.
HAY-LOADER.

No. 175,559. Patented April 4, 1876.

Attest
John Galloway
J. C. Buckhacett

Inventor:
William Jefferson Hicks

N. PETERS, PHOTO-LITHOGRAPHER, WASHINGTON, D.C.

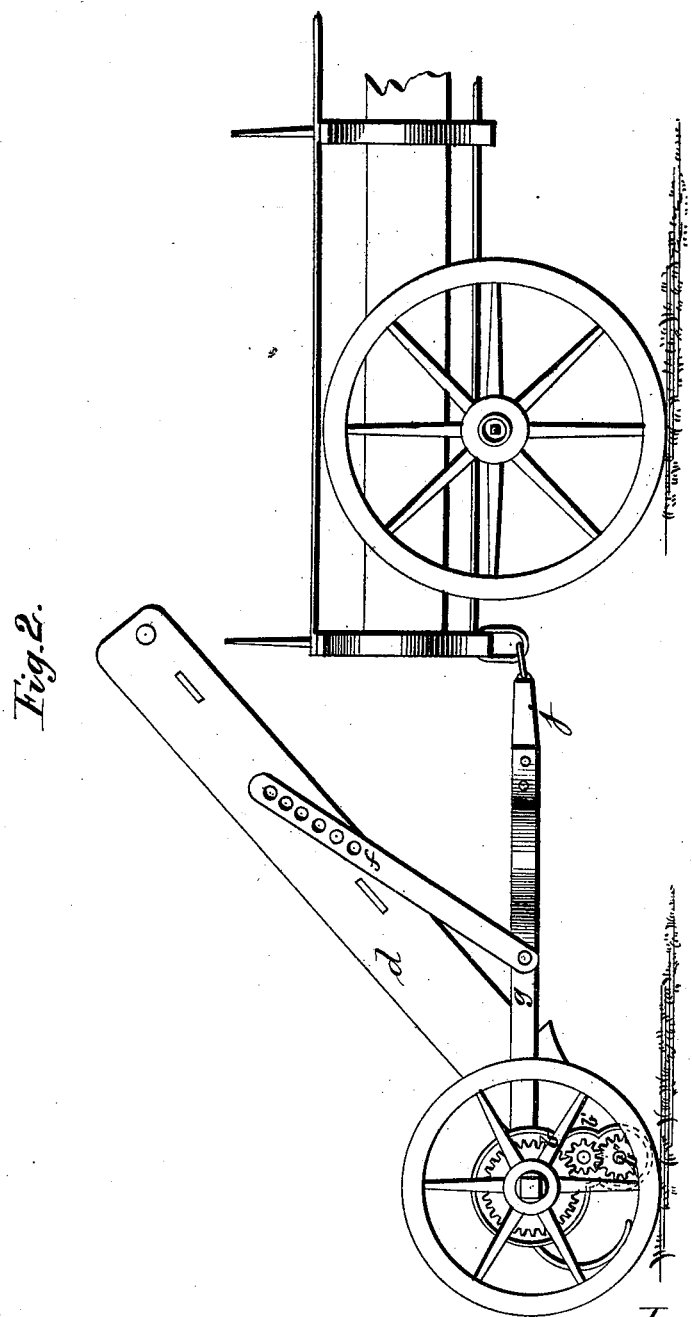

UNITED STATES PATENT OFFICE.

WILLIAM J. HICKS, OF ANN ARBOR, MICHIGAN.

IMPROVEMENT IN HAY-LOADERS.

Specification forming part of Letters Patent No. 175,559, dated April 4, 1876; application filed June 10, 1875.

*To all whom it may concern:*

Be it known that I, WILLIAM JEFFERSON HICKS, of Ann Arbor, in the county of Washtenaw and State of Michigan, have invented an Improvement in Machines for Raking and Elevating Hay upon a Wagon while in motion over the field; and I do hereby declare that the following is a full and exact description of the same.

This machine is of that class designed to be attached to the rear part of a wagon, and as the wagon moves over the field to rake the hay and elevate it at one and the same time.

My invention consists in certain improvements designed to attain greater facility in the discharge of the hay, and immunity from clogging, as will be understood from the description hereinafter given, and reference to the accompanying drawings, in which—

Figure 1 represents the combined rake and loader; and Fig. 2, said rake and loader in connection with the rear part of a wagon, upon which there is a hay-rack.

In Fig. 1, $a$ represents an ordinary wheeled horse-rake. $b\ b'\ b''$ represent the train of gear, receiving motion from one of the wheels.

The pinion $b''$ is fixed to the shaft, which passes through the lower end of the elevator, and which drives the belts having the elevating-rakes attached.

$c$ represents said shaft. $d$ represents the elevator-frame, about twelve feet in length, and constructed of wood, with the part beneath the elevating-rakes in their ascent suitably floored. $e$ represents the elevating-rakes attached to leather belts, which are driven in such a direction that the hay is carried over the upper surface of the inclined elevator-frame. $f$ represents the supporters, one on each side, for regulating the altitude of the elevator. $g$ represents the brace extending from the axle to the pole. $h$ represents the supporters for the elevator at its lower end, which are suspended from the axle of the rake by passing said axle through their upper ends. The braces marked $g$ are bolted to these supporters. The guards for keeping the elevating-rakes in position while lifting the hay from the rake, and keeping them so until about one-third way up the elevator, are represented at $i$, and at $j$ the pole or tongue, to be attached to the lower side of the wagon-axle, or to the rack, by some convenient means.

By means of the guides $i$, the entrance to which is beneath the inclined elevating-frame, the elevating rake-heads, which are hinged to the belts by means of pintles projecting from their rear edges and resting in sockets attached to the belts, are shut down and held with the teeth projecting in one certain position from the face of the belts before they meet the hay swept up by the horse-rake, and until they pass out from under the guide about one-third of the way up the incline, when they drop back, disengaging the teeth from the hay, which then rests upon the under side of the bar or head now turned at about right angles to the surface of the belt and upon the floor of the incline. By this means the hay is pushed up the floor of the incline or elevator until it reaches the top, when it is free to drop into the rack without obstruction from the teeth.

I claim as my invention—

In a hay elevator or loader, the combination of elevating-rakes $e$, mounted as described, with guides or guards $i$, the entrance to which is on the lower and the exit on the upper side of the inclined elevator-frame, substantially as and for the purpose set forth.

WILLIAM JEFFERSON HICKS.

Witnesses:
 JOHN GALLOWAY,
 I. C. BUCKHARDT.